United States Patent
Ishikawa et al.

(10) Patent No.: US 10,204,617 B2
(45) Date of Patent: Feb. 12, 2019

(54) VOICE SYNTHESIS METHOD AND VOICE SYNTHESIS DEVICE

(71) Applicant: Yamaha Corporation, Hamamatsu-shi, Shizuoka-Ken (JP)

(72) Inventors: Katsumi Ishikawa, Hamamatsu (JP); Osamu Ohshima, Hamamatsu (JP); Eiji Akazawa, Hamamatsu (JP); Naoki Yamamoto, Shimada (JP); Yuki Murakami, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 15/381,201

(22) Filed: Dec. 16, 2016

(65) Prior Publication Data

US 2017/0178622 A1    Jun. 22, 2017

(30) Foreign Application Priority Data

Dec. 18, 2015  (JP) .................................. 2015-247189

(51) Int. Cl.
| | | |
|---|---|---|
| *G10L 13/00* | (2006.01) | |
| *G10L 13/10* | (2013.01) | |
| *A63F 13/54* | (2014.01) | |
| *G10L 13/033* | (2013.01) | |
| *G10L 13/04* | (2013.01) | |
| *A63F 13/814* | (2014.01) | |
| *G10H 1/36* | (2006.01) | |
| *G10L 13/08* | (2013.01) | |

(52) U.S. Cl.
CPC .............. *G10L 13/10* (2013.01); *A63F 13/54* (2014.09); *A63F 13/814* (2014.09); *G10H 1/361* (2013.01); *G10L 13/033* (2013.01); *G10L 13/04* (2013.01); *G10H 2250/455* (2013.01)

(58) Field of Classification Search
CPC ....... G10L 13/10; G10L 13/033; G10L 13/04; A63F 13/54
USPC ................................ 704/235, 258, 260, 266
See application file for complete search history.

(56) References Cited

U.S. PATENT DOCUMENTS

| | | | | |
|---|---|---|---|---|
| 8,745,683 | B1 * | 6/2014 | Maeng ................. | H04N 21/435 725/110 |
| 2002/0026318 | A1 * | 2/2002 | Shibata .................. | G10L 13/04 704/258 |
| 2013/0262121 | A1 | 10/2013 | Kayama et al. | |
| 2014/0244262 | A1 * | 8/2014 | Hisaminato .............. | G10H 1/14 704/258 |

FOREIGN PATENT DOCUMENTS

| | | | |
|---|---|---|---|
| JP | 2013-205638 A | | 10/2013 |
| JP | 2014200354 A | * | 10/2014 |

* cited by examiner

*Primary Examiner* — Thierry L Pham
(74) *Attorney, Agent, or Firm* — Crowell & Moring LLP

(57) ABSTRACT

An information processing device determines whether a predetermined condition with regard to information processing has been met, changes a character for vocalization when the predetermined condition has been met, and generates a sound signal of a synthesized voice obtained by vocalizing the character for vocalization that has been changed.

15 Claims, 4 Drawing Sheets

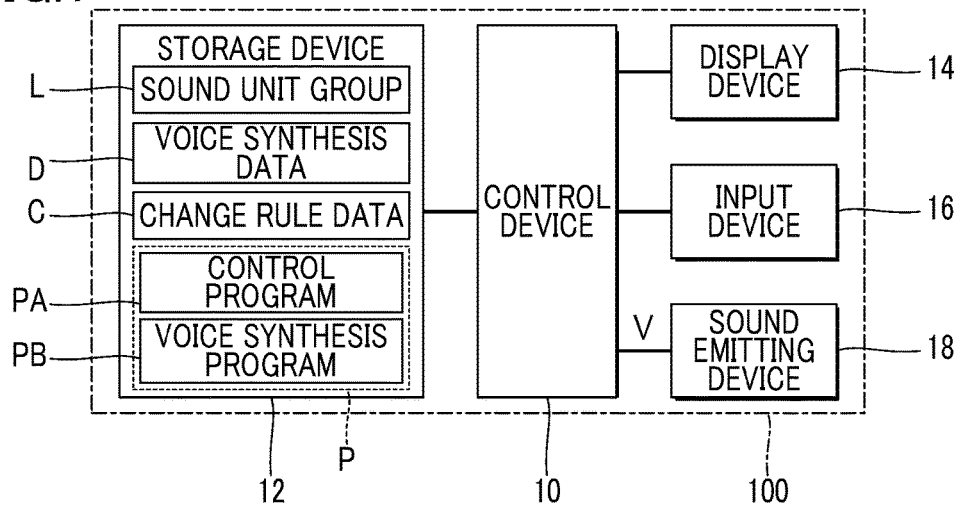
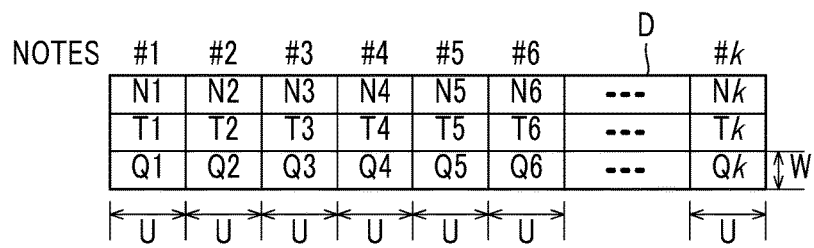
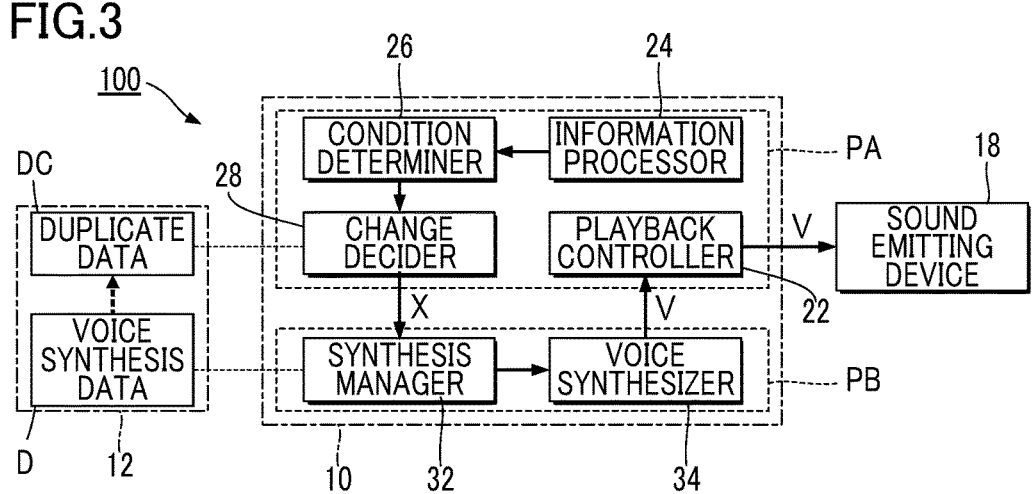

FIG.9

W
(BEFORE CHANGE) | Q:い [i] | Q:ち [tSi] | Q:ば [ba] | Q:ん [N¥] | ---

W
(AFTER CHANGE) | Q:に [Ji] | Q:— [-] | Q:ば [ba] | Q:ん [N¥] | ---

US 10,204,617 B2

VOICE SYNTHESIS METHOD AND VOICE SYNTHESIS DEVICE

BACKGROUND OF THE INVENTION

Field of the Invention

The present invention relates to voice synthesis control.

Description of the Related Art

Techniques for synthesis of voices obtained from vocalization of given character strings, such as lyrics, have been proposed. For example, Japanese Patent Application Laid-Open Publication No. 2013-205638 discloses a technique for synthesizing a singing voice obtained by singing a music track with lyrics selected by a user.

When a synthesized voice is generated merely by vocalizing pre-prepared lyrics, there is a tendency for the thus generated synthesized voice to be perceived by a listener sounding monotonous. Although this problem can be overcome to some extent by preparing in advance numerous sets of different lyrics, thereby enabling generation of a variety of synthesized voices with different lyrics, there is a problem inherent to this technique in that an excessive work load is incurred in preparing in advance a variety of sets of lyrics.

SUMMARY OF THE INVENTION

In view of the problems outlined above, the present invention has as its object ready generation of synthesized voices that have a rich vocal content.

In view of the problems of the prior art, as one aspect of the present invention there is provided a voice synthesis method that is executed by a computer, the method including: determining whether a predetermined condition with regard to information processing has been met; changing a character for vocalization when the predetermined condition has been met; and generating a sound signal of a synthesized voice obtained by vocalizing the character for vocalization that has been changed.

A voice synthesis method according to another aspect of the present invention is executed by a computer, and the method may include: changing a character for vocalization according to a change content that is determined when a predetermined condition with regard to information processing has been met; and generating a sound signal of a synthesized voice obtained by vocalizing the character for vocalization that has been changed.

A voice synthesis device according to still another aspect of the present invention may include: a synthesis manager configured to change a character for vocalization according to a change content that is determined when a predetermined condition with regard to information processing has been met; and a voice synthesizer configured to generate a sound signal of a synthesized voice obtained by vocalizing the character for vocalization that has been changed.

BRIEF DESCRIPTION OF THE DRAWINGS

FIG. 1 is a diagram showing a configuration of an information processing device according to a first embodiment.

FIG. 2 is a schematic diagram of a set of voice synthesis data.

FIG. 3 is a diagram showing a configuration of the information processing device, with a focus on the functions of the device.

FIG. 9 is a diagram illustrative of changes in a character string for vocalization according to a fourth embodiment.

DESCRIPTION OF THE EMBODIMENTS

First Embodiment

Figure 4:
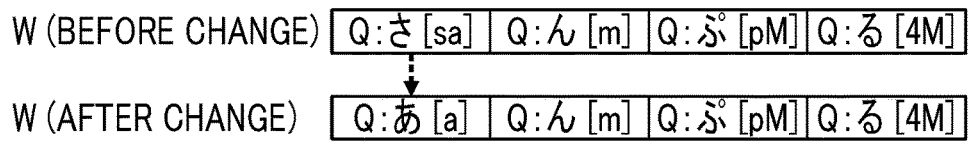
FIG. 4 is a diagram illustrative of character string changes according to the first embodiment.

FIG. 1 is diagram showing a configuration of an information processing device 100 according to a first embodiment of the present invention. The information processing device 100 of the first embodiment is a signal processing device that generates a sound signal V representative of a synthesized voice. The information processing device 100 is realized by a computer system that includes a control device 10, a storage device 12, a display device 14, an input device 16 and a sound emitting device 18. For example, portable terminal devices such as mobile phones or smartphones, as well as portable or stationary terminal devices such as personal computers may be used as the information processing device 100. The information processing device 100 of the first embodiment generates a sound signal V of a voice obtained from a particular music track that is sung (hereinafter, a "target music track"). The information processing device 100 may be formed as an integrated device, namely, as a single unit, or alternatively, it may be formed from multiple discrete devices, each of which is independently configured, as in, for example, a computer system.

The control device 10 is a computer that integrates control of the different elements of the information processing device 100, and may be realized by use of, for example, a Central Processing Unit (CPU). The display device 14 (e.g., a liquid crystal display panel) displays a screen as instructed by the control device 10. The input device 16 is a user interface capable of accepting instructions from a user, and configured, for example, by implementation of multiple operators that are able to detect user operations; or by use of a touch panel that is able to detect when the user touches the display screen of the display device 14. The sound emitting device 18 (e.g., speakers or headphones) plays a synthesized voice corresponding to a sound signal V generated by the information processing device 100. For the sake of convenience of description in view of common knowledge in the art, depiction and details of a D/A convertor that converts the sound signal V from a digital signal to an analog signal has been omitted from the figure.

The storage device 12 stores a program executed by the control device 10 together with a variety of data used by the control device 10. For example, a publicly known recording medium, such as a semiconductor recording medium or a magnetic recording medium, or a combination of multiple types of recording media may be freely selected for use as the storage device 12. It is also possible to configure the storage device 12 (e.g., a cloud storage) independently from a storage device of the information processing device 100, and implement the control device 10 so as to read and write information from and into the storage device 12 via a communication network, such as a mobile communication network or the Internet. In other words, the storage device 12 may optionally be omitted from inclusion in the information processing device 100.

The storage device 12 of the first embodiment stores a sound unit group L and voice synthesis data D. The sound unit group L is a collection (voice synthesis library) of multiple sound units recorded in advance from a particular person's voice. Each of the sound units is a phoneme (e.g., a vowel or a consonant) or a phoneme chain (e.g., a diphone or a triphone) in which a plurality of phonemes are concatenated together. The sound units are stored in the storage device 12, and each sound unit can be stored, for example, as data representative of a spectrum in a frequency domain or representative of a waveform in a time domain.

Voice synthesis data D is time sequence data for use in designating a target voice that is a target of voice synthesis. In FIG. 2 there is shown in a time sequence k pieces of unit data U, wherein k denotes an integer equal to or greater than 1, and wherein each piece of the unit data U corresponds to a note in a target music track, with each note differing from the other notes. Each piece of unit data U corresponds to a given note, and each of the notes includes the following characteristics: a pitch N (N1, N2, N3, . . . , or Nk) of the note, a duration of vocalization T (T1, T2, T3 . . . , or Tk), and a character for vocalization Q (Q1, Q2, Q3, . . . , or Qk). The pitch N is, for example, a note number that complies with the Musical Instrument Digital Interface (MIDI) standard. The vocalization duration T is a duration in which a corresponding note in a target music track is vocalized, and is designated, for example, by the start and end of the note or by the duration (continuous time length) of the note. As will be understood from the above explanation, a time sequence of the pitches N and the vocalization durations T extending across multiple pieces of unit data U correspond to a sequence of notes constituting a target music track.

The character for vocalization Q is a code that indicates a vocalized content of a synthesized voice (i.e., lyrics). A given character for vocalization Q is designated using a grapheme or a phonetic symbol. A phonetic symbol is a symbol that represents a phoneme, such as a vowel or a consonant component, and is notated, for example, in a format compliant with Extended Speech Assessment Methods Phonetic Alphabet (X-SAMPA). In the explanation given below, phonetic symbols compliant with X-SAMPA are enclosed within square brackets. As shown in FIG. 2, a time sequence of characters for vocalization Q (hereinafter, a "character string for vocalization W") that correspond to k pieces of unit data U constitute the lyrics of a target music track.

As shown in FIG. 1, there is stored in the storage device 12 of the first embodiment a program P. The program P is a software program used for carrying out information processing for a particular purpose, and, for example, is transferred to the storage device 12 after being distributed from a distribution device, such as a web server, via a communication network. It is also possible to transfer, to the storage device 12, the program P stored in a portable recording medium, such as a semiconductor recording medium or an optical disc.

The program P of the first embodiment includes a control program PA and a voice synthesis program PB. The control program PA is a program module (application program) that realizes information processing for a particular purpose. The voice synthesis program PB is a program module used for generating a sound signal V of a synthesized voice under control of the control program PA. The voice synthesis program PB is, for example, a plug-in module provided as a Software Development Kit (SDK) used for developing the control program PA.

FIG. 3 is a diagram showing a configuration of the information processing device 100, with a focus on its functions. As shown in FIG. 3, multiple functions (a playback controller 22, an information processor 24, a condition determiner 26, a change decider 28, a synthesis manager 32, and a voice synthesizer 34) are realized through the execution of the program P by the control device 10. More specifically, the playback controller 22, the information processor 24, the condition determiner 26, and the change decider 28 are realized through coordination between the control device 10 and the control program PA, and the synthesis manager 32 and the voice synthesizer 34 are realized through coordination between the control device 10 and the voice synthesis program PB. The present embodiment may employ a configuration in which the functions of the control device 10 are realized in multiple discrete devices (i.e. a computer system), or a configuration in which a part of the functions of the control device 10 is assigned to exclusive electronic circuitry.

The synthesis manager 32 in FIG. 3 is a sequencer that sequentially processes each of the k pieces of unit data U of voice synthesis data D. The voice synthesizer 34 generates a sound signal V of a synthesized voice that corresponds to the character string for vocalization W designated by the voice synthesis data D, which is achieved by voice-synthesizing the pieces of unit data U, each of which is sequentially processed by the synthesis manager 32. The voice synthesizer 34 of the first embodiment generates a sound signal V by employing concatenative voice synthesis processing, by which selected sound units of the sound unit group L stored in the storage device 12 are concatenated. More specifically, the voice synthesizer 34, each time the synthesis manager 32 processes a piece of unit data U, the synthesizer selects from the sound unit group L sound units corresponding to a character for vocalization Q designated by the subject piece of unit data U, and concatenates the selected sound units, after adjustment to the corresponding pitch N and vocalized duration T designated by the piece of unit data U, to generate the sound signal V. The method by which the voice synthesizer 34 generates a sound signal V (voice synthesis processing) is not limited to the above example. For example, it is possible to generate a sound signal V corresponding to the character string for vocalization W through voice synthesis that uses a statistical model such as the Hidden Markov Model.

The playback controller 22 causes the sound emitting device 18 to play a synthesized voice by supplying to the sound emitting device 18 the sound signal V generated by the voice synthesizer 34. It is also possible for the playback controller 22 to carry out effect processing that can impart to a sound signal V a variety of sound effects, such as an echo effect, or an accompaniment playback processing that causes accompaniment of a target music track to synchronize with a synthesized voice.

The information processor 24 executes various types of information processing. The information processor 24 of the first embodiment carries out, for example, information processing for a video game (game processing) in which a character operated by a user appears in a virtual space, and at the same time, causes the display device 14 to display a game screen corresponding to the processing result. More specifically, the information processor 24 controls various parameters that relate to character conditions (hereinafter, "state parameters") so as to be variable in correspondence with the progress of the game; wherein the game progresses in accordance with instructions input by the user into the input device 16. Examples of the state parameters include: a degree of skill indicative of whether an ability of a character is high or low; a degree of fatigue indicative of a degree of fatigue of the character; and a value for emotion indicative of a level of a certain emotion present in the character. A synthesized voice that is played in the first embodiment, for example, is a singing voice vocalized by the character in the virtual space. Under this circumstance, the information processor 24 instructs the voice synthesizer 34 to carry out voice processing at a timing that is relative to a point of progress in the game.

The condition determiner 26 determines whether a predetermined condition with regard to information processing carried out by the information processor 24 (hereinafter, "particular condition") has been met. As an example, a particular condition that is given in the first embodiment is a case in which a state parameter exceeds a predetermined threshold as the state parameter increases. In other words, the condition determiner 26 determines that a particular condition is not met when one of the state parameters, such as a degree of fatigue or a value for emotion, falls below a corresponding threshold, and a determination is made that the particular condition is met when one of the state parameters exceeds the corresponding threshold. Another particular condition that may be selected from among the state parameters is a degree of skill that falls below a predetermined threshold, as the degree of skill of a character decreases. The determination by the condition determiner 26 as to whether a particular condition has been met is repeatedly performed, for example, at each predetermined period of time.

When the condition determiner 26 determines that a particular condition has been met, the change decider 28 generates a change instruction X to change a character string for vocalization W that is designated by the voice synthesis data D stored in the storage unit 12. In other words, when a particular condition is met, the change instruction X is generated for a change in the character string for vocalization W. The change instruction X is an instruction directed to the synthesis manager 32 to change the character string for vocalization W. More specifically, the change instruction X of the first embodiment designates a position (hereinafter, a "change position") X1 of a character for vocalization Q, which is a change target within the character string for vocalization W. The change instruction X can also designate a change content X2, namely, a different character to that of the original target character for change is designated as the character for which the vocalization Q is to be changed.

The change decider 28 of the first embodiment decides the change position X1 and the change content X2 by referring to change rule data C that is stored in the storage device 12. The change rule data C consists of data that stipulate a rule for changing the character string for vocalization W within the voice synthesis data D. FIG. 4 is a diagram explaining a change rule of the character string for vocalization W that is designated by the change rule data C. The change rule data C of the first embodiment stipulates a rule for changing the character string for vocalization W so that a listener of the concomitant sound would perceive that the synthesized voice of the character string for vocalization W that has been changed is a result of a vocalization error; for example, singing incorrect lyrics of the character string for vocalization W before having been changed. More specifically, the change rule data C of the first embodiment stipulates changing a character for vocalization Q that is formed of both a consonant and a vowel to another character for vocalization Q that is formed of the vowel only. For example, as shown in FIG. 4, the change rule data C stipulates changing a character for vocalization Q [sa] that is formed of a consonant "s" and a vowel "a" to a character for vocalization Q [a] that is formed of the vowel "a" only. Under the abovementioned rule, for example, the character string for vocalization W (sanpuru: [sa] [m] [pM] [4M])—the word "sample" in Japanese—is changed to a character string for vocalization W (anpuru: [a] [m] [pM] [4M]) by omitting the consonant of the first character for vocalization Q [sa]. The change decider 28 in FIG. 3, under the rule stipulated by the change rule data C, searches within the character string for vocalization W for a character for vocalization Q that will be the change target, determines the position of the character for vocalization Q found as the target as a change position X1, and determines a change content X2 that corresponds to the change rule designated by the change rule data C. The change decider 28 then generates a change instruction X specifying the change position X1 and the change content X2 as decided.

The change instruction X that the change decider 28 has generated is supplied to the aforementioned synthesis manager 32. In other words, the change decider 28 transmits the change instruction X to the synthesis manager 32, and the synthesis manager 32 receives the change instruction X from the change decider 28. According to the change instruction X, the synthesis manager 32 changes the character string for vocalization W of the voice synthesis data D stored in the storage device 12. More specifically, the synthesis manager 32 searches, within the character string for vocalization W, for the character for vocalization Q that is at the change position X1 designated by the change instruction X, and changes the character for vocalization Q according to the change content X2 designated by the change instruction X. For example, as shown in the abovementioned FIG. 4, the character string for vocalization W (sanpuru: [sa] [m] [pM] [4M]) is changed to the character string for vocalization W (anpuru: [a] [m] [pM] [4M]) in which the character for vocalization Q [sa] designated by the change position X has been substituted with the character for vocalization Q [a] designated by the change content X2.

The voice synthesizer 34 generates a sound signal V of a synthesized voice that is indicated by the voice synthesis data D that has had the character string for vocalization W changed according to the change instruction X. As mentioned above, a change instruction X is generated when a particular condition has been met. Accordingly, when a particular condition has not been met, the voice synthesizer 34 of the first embodiment generates a sound signal V corresponding to the voice synthesis data D, whose character string for vocalization W that has not undergone a change that is applied when the particular condition has been met, whereas, in contrast, when a particular condition has been met, the voice synthesizer 34 generates a sound signal V corresponding to the voice synthesis data D that has had the character string for vocalization W changed according to a change instruction X. In other words, the listener of the synthesized voice perceives that a character has sung the wrong lyrics to the target music track when the particular condition has been met. As will be understood from the above explanation, the synthesis manager 32 and the voice synthesizer 34 of the first embodiment function as an element (synthesis processor) that changes a character string for vocalization W and that generates a sound signal V of a synthesized voice that is obtained by vocalizing the character string for vocalization W that has been changed.

Figure 5:
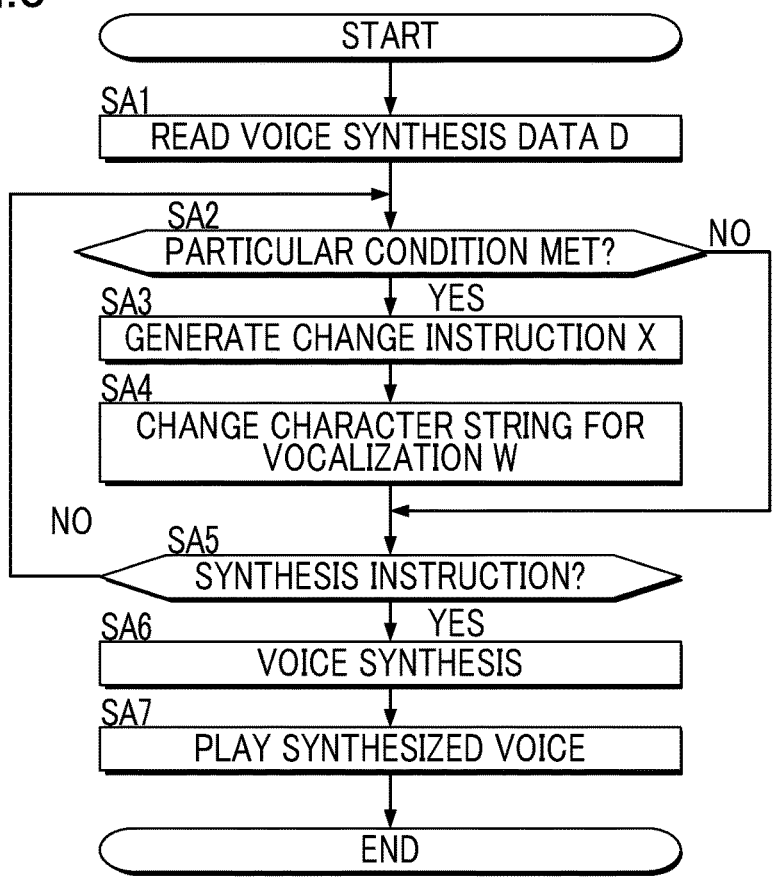
FIG. 5 is a flowchart showing the flow of an overall operation of the information processing device.

FIG. 5 is a flowchart showing a flow of a generation processing of a sound signal V that is carried out by the information processing device 100 of the first embodiment. The processing of FIG. 5 is initiated, triggered, for example, by a user's instruction input into the input device 16 or by an instruction from the information processor 24. As the processing is initiated, the synthesis manager 32 reads the voice synthesis data D into the storage device 12, and as shown in FIG. 3, stores a copy of the voice synthesis data D (hereinafter, "duplicate data") DC in the storage device 12 (SA1).

The information processor 24, in parallel to the processing shown in FIG. 5, carries out information processing of a video game, which information processing includes control of state parameters of a character. The condition determiner 26 determines whether a particular condition with regard to the information processing carried out by the information processor 24 has been met (SA2). For example, the condition determiner 26 determines whether any of the state parameters of the character exceeds a corresponding threshold.

When the condition determiner 26 determines that a particular condition has been met (SA2: YES), the change decider 28 generates a change instruction X to change the character string for vocalization W (SA3). More specifically, the change decider 28 searches for a character for vocalization Q that matches the rule designated by the change rule data C from among the character string for vocalization W of the duplicate data DC and generates a change instruction X that includes a change position X1 and a change content X2 corresponding to the character for vocalization Q. The synthesis manager 32 changes the character string for vocalization W of the voice synthesis data D stored in the storage device 12 according to the change instruction X generated by the change decider 28 (SA4). On the other hand, when the condition determiner 26 determines that the particular condition has not been met (SA2: NO), the generation of a change instruction X by the change decider 28 (SA3) and the change of the character string for vocalization W by the synthesis manager 32 (SA4) are not carried out. In other words, the character string for vocalization W of the voice synthesis data D is changed, due to fulfillment of the particular condition. In the first embodiment, the character string for vocalization W is changed each time a particular condition is met.

The information processor 24 instructs the voice synthesizer 34 to begin voice synthesis using the voice synthesis data D of the target music track, for example, at a timing that is relative to a point of progress in the game. The voice synthesizer 34 determines whether it has been instructed by the information processor 24 to begin voice synthesis (SA5). When the voice synthesizer 34 has not been instructed to begin voice synthesis (SA5: NO), the processing moves to step SA2 and the determination as to whether the particular condition has been met (SA2) and the change of the character string for vocalization W according to the determination result (SA3 and SA4) are repeated. In other words, the character string for vocalization W is changed in a cumulative manner, every time the particular condition is met.

When the voice synthesizer 34 has been instructed to begin voice synthesis (SA5: YES), it generates a sound signal V through voice synthesis processing using the current voice synthesis data D (SA6). The playback controller 22 causes the sound emitting device 18 to play a synthesized voice of the sound signal V generated by the voice synthesizer 34. As understood from the above explanation, at a stage at which no particular condition has been met, a synthesized voice obtained by vocalizing an initially prepared character string for vocalization W (for example, the correct lyrics to a target music) is played, and triggered by the satisfaction of the particular condition, a synthesized voice of the character string for vocalization W that has been changed according to a rule designated by the change rule data C (e.g., a voice singing the wrong lyrics to the target music) is played.

As described above, in the first embodiment, when a particular condition has been met, the character string for vocalization W is partially changed, and a sound signal V of a synthesized voice obtained by vocalizing the character string for vocalization W that has been changed is played. Accordingly, it is possible to readily generate synthesized voices that are rich in their vocalized contents. Furthermore, in the first embodiment, when a particular condition has been met, a character string for vocalization W is changed and a sound signal V of a synthesized voice obtained by vocalizing the character string for vocalization W that has been changed is generated, whereas when a predetermined condition has not been met, a sound signal V of a synthesized voice obtained by vocalizing the character string for vocalization W that has not undergone a change that is performed when the predetermined condition has been met is generated. Accordingly, it is possible to generate synthesized voices that are rich in their vocalized content, with some voices having their initial character string for vocalization W changed and other voices having their initial character string for vocalization W unchanged.

Second Embodiment

A second embodiment of the present invention will be described. In the below exemplary embodiments, for elements whose effects and functions are substantially the same as those in the first embodiment, the same reference numerals as those of the first embodiment are used and detailed explanations of such effects and functions are omitted where appropriate.

Figure 6:
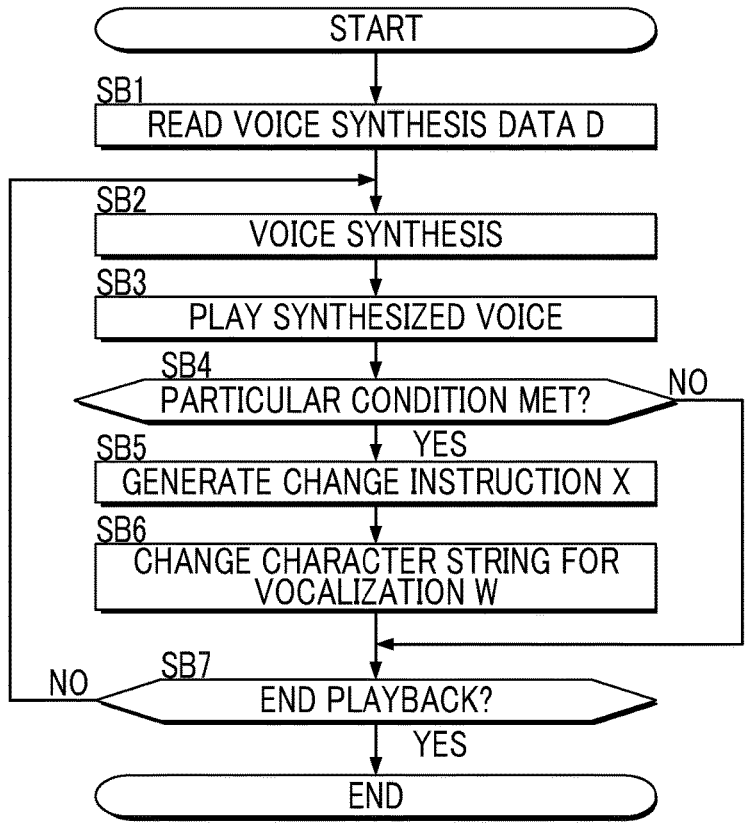
FIG. 6 is a flowchart showing the flow of an operation according to a second embodiment.

FIG. 6 is a flowchart showing a flow of an operation of the information processing device 100 of the second embodiment. As shown in FIG. 6 as an example, as voice synthesis data D is read in the same way as in the first embodiment (SB1), the voice synthesizer 34 of the second embodiment begins generating a sound signal V through voice synthesis processing using the voice synthesis data D (SB2). The playback controller 22 causes the sound emitting device 18 to play the synthesized voice by supplying the sound emitting device 18 with the sound signal V generated by the voice synthesizer 34 (SB3).

In the second embodiment, the changing of a character string for vocalization W, which is triggered by the satisfaction of a particular condition (SB4-SB6), is carried out in real time, in parallel to the generation of the sound signal V by the voice synthesizer 34 (SB2) and to the playback of the synthesized voice by the playback controller 22 (SB3). More specifically, the condition determiner 26 determines whether a particular condition with regard to information processing by the information processor 24 has been met (SB4). When the condition determiner 26 determines that the particular condition has been met (SB4: YES), the generation of a change instruction X by the change decider 28 (SB5) and the change of the character string for vocalization W by the synthesis manager 32 (SB6) are carried out in a similar way as in the first embodiment. In contrast, when the condition determiner 26 determines that the particular condition has not been met (SB4: NO), the generation of a change instruction X (SB5) and the change of the character string for vocalization W (SB6) are not carried out.

The synthesis manager 32 determines whether to end the playback of the synthesized voice (SB7). The playback of the synthesized voice ends, for example, when the playback of the synthesized voice for the entire duration of the target music track has been completed, when an instruction to end the playback of the synthesized voice has been given from the information processor 24, or when an instruction to end the playback of the synthesized voice has been input into the input device 16 by a user (SB7: YES). When the playback of the synthesized voice is not to be ended (SB7: NO), the processing moves to step SB2. Accordingly, the generation of the sound signal V (SB2) and the playback of the synthesized voice (SB3) are continued, and changing of the character string for vocalization W triggered by the satisfaction of the particular condition (SB4-SB6) is carried out. In other words, in the midst of playing a synthesized voice obtained by vocalizing the character string for vocalization W, the character string for vocalization W is changed in a dynamic manner, triggered by the satisfaction of a particular condition.

The same effects as those of the first embodiment are realized by the second embodiment. Furthermore, by the second embodiment, it is possible to generate synthesized voices that are rich in their vocalized content, reflecting the results of information processing by the information processor 24 (e.g., the level of progress in a game) since the character string for vocalization W is dynamically changed in correspondence with the generation of a sound signal V (SB2). For example, it is possible to make a game more exciting where the character string for vocalization W is dynamically changed according to a state parameter of a character in a virtual space.

Third Embodiment

Figure 7:
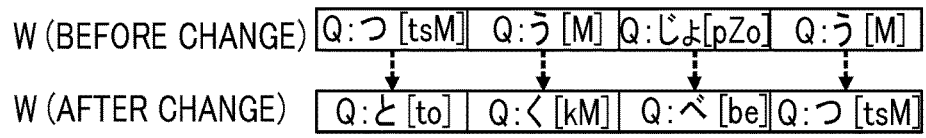
FIG. 7 is a diagram illustrative of changes in a character string for vocalization according to a third embodiment.

FIG. 7 is a diagram explaining the changing of a character string for vocalization W in a third embodiment. As shown in FIG. 7, in the third embodiment, when a particular condition has been met, a particular character string (hereinafter, a "target character string") within a character string for vocalization W of voice synthesis data D is changed to another character string (hereinafter, a "replacement character string") that has been selected in advance as a replacement candidate. More specifically, as shown in FIG. 7, in the change rule data C of the third embodiment, a replacement character string (tokubetsu: [to] [kM] [be] [tsM])—the word "special" in Japanese—is registered corresponding to a target character string (tsujo: [tsM] [M] [dZo] [M])—the word "ordinary" in Japanese—in the character string for vocalization W.

When a particular condition has been met (SA2: YES), the change decider 28 of the third embodiment searches for a target character string registered in the change rule data C from the character string for vocalization W of the duplicate data DC. Then, the change decider 28 generates a change instruction X that includes a change position X1 of the target character string within the character string for vocalization W and a change content X2 that designates a replacement character string that corresponds to the target character string (SA3). The synthesis manager 32 changes the target character string, within the character string for vocalization W of the voice synthesis data D, that has been designated by the change position X1 of the change instruction X, to the replacement character string designated by the change content X2 (SA4). The processing for generating a sound signal V corresponding to the character string for vocalization W that has been changed (SA5 and SA6) is substantially the same way as that of the first embodiment. The same effects as those of the first embodiment are attained by the third embodiment.

In FIG. 7, an example configuration is given in which one target character string corresponds to one replacement character string in the change rule data C, but it is also possible to have multiple replacement character strings registered corresponding to one target character string. For example, in the change rule data C shown as an example in FIG. 8, plural replacement character strings (mikan: [m'i] [ka] [N¥])—the word "mikan orange" in Japanese—and (banana: [ba] [na] [na])—the word "banana" in Japanese—are registered with respect to a target character string (ringo: [4'i] [N] [go])—the word "apple" in Japanese. When a particular condition has been met, the change decider 28 generates a change instruction X that includes a change position X1 of a target character string within the character string for vocalization W and a change content X2 that designates a replacement character string corresponding to the target character string (SA3). One of multiple replacement character strings corresponding to one target character string may be selected as the change content X2 in a freely selected manner, and randomly selecting one replacement character string out of multiple replacement character strings is an example of how the selection is performed.

Fourth Embodiment

FIG. 9 is a diagram explaining the changing of a character string for vocalization W in a fourth embodiment. As shown in FIG. 9, in the fourth embodiment, when a particular condition has been met, a particular target character string (a first portion) within the character string for vocalization W of voice synthesis data D is replaced with another character string (replacement character string, or second portion) contained in the character string for vocalization W. More specifically, assuming that a target music track consists of two melodies (first and second), a target character string of the first melody of the target music track within the character string for vocalization W is changed to a replacement character string of the second melody of the target music track. For example, a target character string contained in the first melody of the target music track (ichiban: [i] [tSi] [ba] [N¥])—the word "first" in Japanese—is changed to a replacement character string (niban: [Ji] [-] [ba] [N¥])—the word "second" in Japanese—contained in the second melody of the target music track. A target character string or a replacement character string may be a word, such as the above, or alternatively, may be a phrase formed of multiple words or an entire melody. In a case in which an entire melody is the target of replacement, an example embodiment would be one in which the entire lyrics for the first melody being the target character string and the lyrics of the second melody being the replacement character string. Accordingly, it could be understood that the change rule data C according to the fourth embodiment stipulates that a first portion of a character string for vocalization W to be the target character string and a second portion of a character string for vocalization W, the second portion being different from the first portion, to be the replacement character string.

When a particular condition has been met, the change decider 28 of the fourth embodiment generates a change instruction X that includes a change position X1 of a target character string within the character string for vocalization W and a change content X2 that designates a replacement character string corresponding to the target character string within the character string for vocalization W (SA3). The synthesis manager 32 changes the target character string, within the character string for vocalization W of the voice synthesis data D, designated by the change position X1 to the replacement character string designated by the change content X2 (SA4). The processing for generating a sound signal V of a synthesized voice obtained by vocalizing the character string for vocalization W that has been changed (SA5 and SA6) is similar to that of the first embodiment. The same effects as those of the first embodiment can be realized by the fourth embodiment.

The third embodiment and the fourth embodiment described above have the first embodiment as their bases, but the configuration of the third embodiment or that of the fourth embodiment in which a target character string of a character string for vocalization W is changed to a replacement character string may be similarly adapted to the second embodiment in which a character string for vocalization W is dynamically changed in parallel to the generation of a sound signal V by the voice synthesizer 34.

Modifications

The above embodiments may be modified in various ways. Specific modifications are described below as examples. Two or more embodiments freely selected from the below examples may be combined as appropriate.

(1) One of the example particular conditions described in the above embodiments is a condition that a state parameter of a character exceeds a parameter as the state parameter increases, but the specifics of the particular condition are not limited to the above example. More specifically, a condition that points won by a user in a video game exceeds (or falls below) a predetermined threshold may be employed as a particular condition. For example, when more points are won than a threshold, a target character string of a character string for vocalization W is changed to a particular replacement character string as exemplified in the third embodiment. In addition, assuming that various events (game events) occur as a video game advances, it is possible to change a character string for vocalization W, triggered by the occurrence of a particular event in a game serving as a particular condition.

It is also possible to employ, as a particular condition, an occurrence of an action by a user performing a particular operation to the input device 16. More specifically, when a user selects any one of multiple images by operating the input device 16, a target character string of a character string for vocalization W is changed to a particular replacement character string as exemplified in the third embodiment. For example, with the circumstance exemplified in FIG. 8 in mind, when a user selects an image of a mikan orange out from multiple candidates, the target character string (ringo: [4'i] [N] [go]) corresponding to apple is changed to the replacement character string (mikan: [m'i] [ka] [N¥]) that corresponds to the image. Alternatively, when the user selects an image of a banana, the target character string (ringo: [4'i] [N] [go]) corresponding to apple is changed to the replacement character string (banana: [ba] [na] [na]) that corresponds to the image.

A condition that a sound collection device (e.g., a microphone) collects a sound with an intensity that exceeds a predetermined threshold, or a condition that some kind of sensor, such as a touch sensor, detect a particular condition may be selected as a particular condition, and triggered by the satisfaction of such a particular condition, a character string for vocalization W may be changed. As understood from the above explanation, the condition determiner 26 (step SA2) of each of the aforementioned embodiments is comprehensively represented as an element that determines whether a particular condition with regard to information processing carried out by the information processor 24 is met, and the specific content of the particular condition may be freely selected. In a preferred embodiment, however, a condition that the changing (i.e., editing) of a character string for vocalization W has been instructed by a user may be excluded from particular conditions. Accordingly, a condition that a specific change position or change content of the character string for vocalization W has been directly instructed by a user, for example, is not included as particular conditions. In other words, the condition determiner 26 may preferably determine whether a particular condition has been met, depending on a certain condition that differs from that which would result from a user inputting a change instruction for a character string for vocalization W. Beside a configuration in which one of the abovementioned various particular conditions is set to be the particular condition, it is also possible to employ a configuration in which there are met two or more of the multiple conditions set to be a single particular condition, or a configuration in which where any one of multiple conditions is met is set to be a particular condition.

(2) In each of the aforementioned embodiments, a case in which a portion to be changed (for example, a character for vocalization Q or a target character string) is determined according to the change rule data C is given as an example. However, selecting a portion to be changed within the character string for vocalization W is not limited thereto. For example, it is possible to select, as a portion to be changed, a portion within a character string for vocalization W that is designated as a result of a user's operation of the input device 16.

(3) In the third embodiment, a replacement character string that replaces a target character string within a character string for vocalization W is specified in advance. In the fourth embodiment, a target character string in a character string for vocalization W is replaced with a replacement character string that is also included in the same character string for vocalization W. However, replacement character strings that are used to change character strings for vocalization W are not limited to these examples. For example, it is possible to replace a target character string within a character string for vocalization W with a replacement character string designated as a result of a user's operation of the input device 16; or with a replacement character string identified as a result of voice recognition of a speech sound collected by a sound collection device.

(4) In each of the aforementioned embodiments, the condition determiner 26 determines only whether a particular condition has been met. However, it is also possible for the change decider 28 to vary a target character string within the character string for vocalization W according to values of various parameters (for example, state parameters) related to information processing. For example, one possible configuration is that in which the greater the value of a state parameter, the greater the number of characters that are to be changed within the character string for vocalization W.

(5) It is possible that a surplus or a shortage in the number of notes in a target music track may occur when the number of characters differs between a target character string within a character string for vocalization W and a replacement character string. For example, it is possible that a surplus of notes that are not allocated to any character for vocalization Q may occur because, when the number of characters in a target character string exceeds the number of characters in a replacement character string, the number of characters decreases due to a change in the character string for vocalization W. In such a circumstance, a preferable configuration would be one in which the pieces of unit data U corresponding to the surplus notes is deleted from the voice synthesis data D by the synthesis manager 32. In contrast, it is possible that a shortage of notes corresponding to characters for vocalization Q may occur in the event that the number of characters in a target character string is smaller than the number of characters of a replacement character string, whereby the number of characters increases due to a change in the character string for vocalization W. In this circumstance, a preferable configuration would be one in which the synthesis manager 32 adds to the voice synthesis data D pieces of unit data U that correspond to notes to which the surplus characters for vocalization Q are allocated, or one in which the synthesis manager 32 divides an existing one or more notes designated by corresponding one or more pieces of unit data U, and allocates to the divided notes the surplus characters for vocalization Q.

(6) It is also possible to generate a change instruction X (change position X1 and change content X2) through selective application of multiple pieces of change rule data C that stipulate rules that differ from one another. More specifically, multiple pieces of change rule data C with differing change rules for a character string for vocalization W are stored in advance in the storage device 12, and the change decider 28 generates a change instruction X by using a piece of change rule data C, the piece of the change rule data C, for example, being selected by a user from among multiple pieces of change rule data C. The method by which a particular piece of the change rule C is selected is not limited to the above example. Another example configuration is one in which any one of the multiple pieces of the change rule data C is automatically selected according to a content or progress with regard to information processing carried out by the information processor 24, in other words, according to different stages of progress in a game. Furthermore, in a configuration in which it is possible to selectively execute multiple control programs PA that are stored in the storage device 12, any one piece of change rule data C may be automatically selected according to a corresponding one of the control programs PA that is actually executed by the control device 10. Alternatively, instead of the configuration selectively using any one of the multiple pieces of change rule data C, two or more particular pieces of change rule data C may be used. More specifically, for example, one may use both the change rule data C of the first embodiment exemplified in FIG. 4 and the change rule data C of the fourth embodiment exemplified in FIG. 9.

(7) In each of the aforementioned embodiments, the program P including both the control program PA and the voice synthesis program PB is shown as an example. However, the control program PA and the voice synthesis program PB may be provided independently from each other. The information processing device 100 exemplified in each of the aforementioned embodiments may be envisaged as a combined device which is realized by the control program PA and a computer working in coordination (voice synthesis control device), or as a device which is realized by the voice synthesis program PB and a computer working in coordination.

(8) In each of the aforementioned embodiments, an example is given of the generation of a sound signal V representative of a singing voice of a target music track. However, the synthesized voice represented by the sound signal V may not necessarily be a singing voice. For example, it is possible to apply the aforementioned embodiments to the generation of a freely selected synthesized voice, such as a speech sound. In other words, the pitch N and the vocalization duration T of the voice synthesis data D may be omitted.

(9) The information processing device 100 exemplified in each of the aforementioned embodiments may be realized by the control device 10 and the program P working in coordination, as stated previously. As will be understood from the explanation of each embodiment, the program P causes a computer (e.g., the control device 10) to function as the condition determiner 26 that determines whether a particular condition has been met, the synthesis manager 32 that changes a character string for vocalization W when the particular condition is met, and the voice synthesizer 34 that generates a sound signal V. The program P (or, the control program PA and/or the voice synthesis program PB) may be provided in a format stored in a computer-readable recording medium and be installed in a computer. A recording medium may be, for example, a non-transitory recording medium, an optical recording medium (optical device) such as a CD-ROM being a preferable example, but commonly known types of recording media, such as a semiconductor recording medium or a magnetic recording medium may be included. A "non-transitory" recording medium referred to in the description includes all types of recording media that may be read by a computer, except for a transitory, propagating signal, and volatile recording media are not excluded. Furthermore, it is possible to distribute the program to a computer in a distributable format via a communication network.

The following aspects of the invention may be derived from the foregoing description. A voice synthesis method according to one aspect of the present invention is executed by a computer, and the method may include: determining whether a predetermined condition with regard to information processing has been met; changing a character for vocalization when the predetermined condition has been met; and generating a sound signal of a synthesized voice obtained by vocalizing the character for vocalization that has been changed. A character for vocalization is a character of a text (text character) for vocalization, examples of which include alphabet letters, Chinese characters, numerals, Japanese kanji, hiragana, and katakana, or written symbols or letters of any other language. According to the abovementioned method, a character for vocalization is changed when a predetermined condition with regard to information processing has been met, and a sound signal of a synthesized voice obtained by vocalizing a character for vocalization that has been changed is generated. Accordingly, it is possible to generate synthesized voices that have a rich vocalized content.

In a preferred embodiment, the method further includes, when the predetermined condition has not been met, generating a sound signal of a synthesized voice obtained by vocalizing the character for vocalization that has not undergone a change that is performed when the predetermined condition is met. According to the abovementioned embodiment, a character for vocalization is changed when a predetermined condition has been met and a sound signal of a synthesized voice obtained by vocalizing the character for vocalization that has been changed is generated; whereas, when the predetermined condition has not been met, a sound signal of a synthesized voice obtained by vocalizing the character for vocalization that has not undergone a change that is performed when the predetermined condition is met is generated. Accordingly, it is possible to generate synthesized voices that have a rich vocalized content, with some voices having one or more of their initial characters for vocalization changed, and with other voices having their initial characters for vocalization unchanged.

In another preferred embodiment, a change of the character for vocalization may include changing the character for vocalization when the predetermined condition has been met, the change being performed in parallel to generation of the sound signal of the synthesized voice. According to this embodiment, it is possible to generate synthesized voices that have a rich vocalized content, reflecting the results of information processing, since a character for vocalization is dynamically changed, in correspondence with the generation of a sound signal.

Preferably, the predetermined condition is a condition that relates to a game. Furthermore, the condition that relates to a game may be a condition that relates to progress in the game, or may be an occurrence of a particular event corresponding to progress in the game (i.e., game event). Alternatively, the condition that relates to a game may be a condition wherein a state parameter exceeds a threshold as the state parameter increases or wherein a state parameter falls below a threshold as the state parameter decreases, the state parameter being indicative of a state of a character that is operated by a user. According to any one of the above embodiments, a character string for vocalization can be changed in a dynamic manner, and in some cases, in a cumulative manner also, corresponding to various conditions relative to a game, such as progress in the game, events in the game, or a condition of a character participating in the game. By implementing these provisions, a game can be made more entertaining and exciting.

Preferably, the predetermined condition may be a condition that is different from an occurrence of an action caused by a user inputting a change instruction for the character for vocalization. A change instruction for the character for vocalization by a user is, for example, a change instruction responsive to editing of a character for vocalization by the user; and the change instruction does not include a selection instruction by which the user selects any one of multiple replacement character strings that have been prepared in advance. According to this aspect, a change instruction of the character for vocalization by the user is not necessary, and it is therefore possible to readily generate synthesized voices that have a rich vocalized content without need for the user to effect complicated editing.

Figure 8:
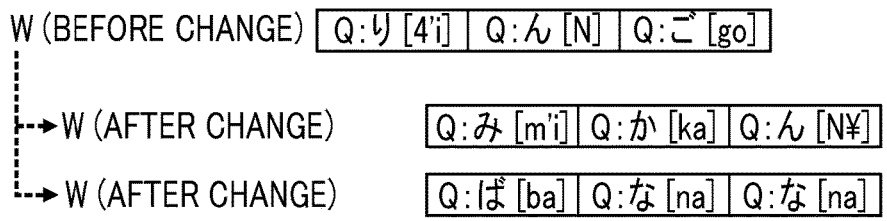
FIG. 8 is a diagram illustrative of changes in a character string for vocalization according to a modification of the third embodiment.

According to a preferable embodiment, changing a character for vocalization may include changing a target character string consisting of two or more characters for vocalization including the character for vocalization. FIG. 7 in reference to the abovementioned third embodiment shows a non-limiting example of this embodiment. According to another preferable embodiment, a change of a character for vocalization may include changing a target character string that includes the character for vocalization to one of plural replacement character strings that have been registered in advance. FIG. 8 also in reference to the abovementioned third embodiment shows a non-limiting example of this embodiment. Furthermore, the change of the character for vocalization may include changing a first portion of a character string for vocalization that includes the character for vocalization, to a second portion within the character string for vocalization, the second portion differing from the first portion. FIG. 9 with reference to the abovementioned fourth embodiment shows a non-limiting example of this embodiment.

According to any one of these embodiments, it is possible to readily make various changes to a character for vocalization.

A voice synthesis method according to another embodiment of the present invention is executed by a computer, and the method may include: changing a character for vocalization according to a change content that is determined when a predetermined condition with regard to information processing has been met; and generating a sound signal of a synthesized voice obtained by vocalizing the character for vocalization that has been changed.

A voice synthesis device according to still another aspect of the present invention may include: a synthesis manager configured to change a character for vocalization according to a change content that is determined when a predetermined condition with regard to information processing has been met; and a voice synthesizer configured to generate a sound signal of a synthesized voice obtained by vocalizing the character for vocalization that has been changed.

DESCRIPTION OF REFERENCE SIGNS

100 . . . information processing device, 10 . . . control device, 12 . . . storage device, 14 . . . display device, 16 . . . input device, 18 . . . sound emitting device, 22 . . . playback controller, 24 . . . information processor, 26 . . . condition determiner, 28 . . . change decider, 32 . . . synthesis manager, 34 . . . voice synthesizer.

What is claimed is:

1. A voice synthesis method that is executed by a computer, the method comprising:
   determining whether a predetermined condition with regard to information processing has been met;
   upon the determination that the predetermined condition has been met, determining a first portion of a text for vocalization as a change target based on a change rule designated by change rule data;
   determining a change position and a change content corresponding to the change rule;
   dynamically replacing, in response to the change rule, the first portion of the text for vocalization with a second portion;
   synthesizing, by the computer, a voice based on the dynamically replaced text for vocalization that includes the second portion in place of the first portion; and
   generating a sound signal of the synthesized voice obtained by vocalizing the text for vocalization,
   wherein the replacement is performed in parallel to the generation of the sound signal.

2. The voice synthesis method according to claim 1, further comprising
   when the predetermined condition has not been met, generating a sound signal of a synthesized voice obtained by vocalizing the text for vocalization that has not undergone a replacement that is performed when the predetermined condition is met.

3. The voice synthesis method according to claim 1, wherein the predetermined condition is a condition that relates to a game.

4. The voice synthesis method according to claim 3, wherein the condition that relates to a game is a condition that relates to progress in the game.

5. The voice synthesis method according to claim 4, wherein the condition that relates to a game is an occurrence of a particular event corresponding to progress in the game.

6. The voice synthesis method according to claim 3, wherein the predetermined condition that relates to a game is one in which a state parameter exceeds a threshold as the state parameter increases, or in which a state parameter falls below a threshold as the state parameter decreases, the state parameter being indicative of a state of a character that is operated by a user.

7. The voice synthesis method according to claim 1, wherein the predetermined condition is a condition that is different from an occurrence of an action caused by a user inputting a change instruction for replacing a part of the text for vocalization.

8. The voice synthesis method according to claim 1, wherein the second portion is a text that is within the text for vocalization and differs from the first portion.

9. The voice synthesis method according to claim 1, wherein
the first portion is constituted by at least one symbol or by at least one grapheme.

10. The voice synthesis method according to claim 9, wherein
the first portion is constituted by a time sequence of phonetic symbols or graphemes.

11. The voice synthesis method according to claim 10, wherein the second portion is one of plural replacement texts that have been registered in advance in association with the first portion.

12. A voice synthesis method that is executed by a computer, the method comprising:
determining a first portion of a text for vocalization as a change target based on a change rule designated by change rule data;
determining a change position and a change content corresponding to the change rule;
dynamically replacing, in response to the change rule, the first portion of the text for vocalization with a second portion according to the change content specified in the change rule that is determined in response to a predetermined condition with regard to information processing being met;
synthesizing, by the computer, a voice based on the dynamically replaced text for vocalization that includes the second portion in place of the first portion; and
generating a sound signal of the synthesized voice obtained by vocalizing the text for vocalization,
wherein the replacement is performed in parallel to the generation of the sound signal.

13. A voice synthesis device comprising:
a synthesis manager configured to:
determine a first portion of a text for vocalization as a change target based on a change rule designated by change rule data;
determine a change position and a change content corresponding to the change rule; and
dynamically replace, in response to the change rule, the first of the text for vocalization with a second portion according to the change content specified in the change rule that is determined in response to a predetermined condition with regard to information processing being met; and
a voice synthesizer configured to:
synthesizing a voice based on the dynamically replaced text for vocalization that includes the second portion in place of the first portion; and
generate a sound signal of the synthesized voice obtained by vocalizing the text for vocalization,
wherein the replacement is performed in parallel to the generation of the sound signal.

14. The voice synthesis method according to claim 1, wherein
the text for vocalization is a time sequence of phonetic symbols or graphemes constituting lyrics of a music track.

15. The voice synthesis method according to claim 1, wherein the predetermined condition is a character parameter of a character in a game.

* * * * *